US012803177B2

(12) United States Patent
Strassner, II

(10) Patent No.: US 12,803,177 B2
(45) Date of Patent: Nov. 17, 2026

(54) RECONFIGURABLE REFLECTOR FOR BICONICAL ANTENNA

(71) Applicant: Massive Light LLC, Spring, TX (US)

(72) Inventor: Bernd Strassner, II, Albuquerque, NM (US)

(73) Assignee: Massive Light LLC, Spring, TX (US)

( * ) Notice: Subject to any disclaimer, the term of this patent is extended or adjusted under 35 U.S.C. 154(b) by 0 days.

(21) Appl. No.: 19/066,446

(22) Filed: Feb. 28, 2025

(65) Prior Publication Data

US 2025/0273868 A1 Aug. 28, 2025

Related U.S. Application Data

(60) Provisional application No. 63/558,752, filed on Feb. 28, 2024.

(51) Int. Cl.
*H01Q 15/14* (2006.01)
*H01Q 1/36* (2006.01)
*H01Q 15/16* (2006.01)

(52) U.S. Cl.
CPC ............. *H01Q 15/147* (2013.01); *H01Q 1/36* (2013.01); *H01Q 15/16* (2013.01)

(58) Field of Classification Search
CPC ......... H01Q 15/147; H01Q 15/16; H01Q 1/36
See application file for complete search history.

(56) References Cited

U.S. PATENT DOCUMENTS 4,605,934 A 8/1986 Andrews
2004/0217908 A1 11/2004 Zigler et al.
2004/0233118 A1* 11/2004 Jocher ...................... H01Q 9/40 343/773
2005/0168391 A1 8/2005 Ratajczak et al.
2020/0052409 A1 2/2020 Scannell

FOREIGN PATENT DOCUMENTS

JP 2006041863 A * 2/2006 ............... H01Q 9/26
WO 2015189471 A1 12/2015
WO 2022118446 A1 6/2022

OTHER PUBLICATIONS

International Search Report and Written Opinion in connection with International Application No. PCT/US2025/017861 dated Jun. 2, 2025, 18 Pages.
Patent Cooperation Treaty: International Preliminary Report on Patentability of PCT/US2025/017861(related application); Sep. 10, 2026; 17 pages.

* cited by examiner

*Primary Examiner* — Hoang V Nguyen

(57) ABSTRACT

An apparatus comprising a biconical antenna for generating an omnidirectional beam pattern is presented. A reflector reflects the omnidirectional beam pattern from the biconical antenna into a predetermined beamform. The reflector comprises a ground plane connected to the biconical antenna and a parabolic reflector extending from the ground plane at a predetermined angle. A curvature of the parabolic reflector reflects the omnidirectional beam pattern into the predetermined beam form. The predetermined angle corrects for beam shift of the predetermined beam form caused by the ground plane.

14 Claims, 9 Drawing Sheets

RECONFIGURABLE REFLECTOR FOR BICONICAL ANTENNA

CROSS-REFERENCE TO RELATED APPLICATIONS

This application claims benefit of U.S. Provisional No. 63/558,752, filed Feb. 28, 2024, entitled RECONFIGURABLE REFLECTOR FOR BICONICAL ANTENNA, the specification of which is incorporated by reference herein in their entirety.

TECHNICAL FIELD

The following disclosure relates to antenna reflectors, and more particularly, to an antenna reflector that is reconfigurable for use with biconical antennas.

BACKGROUND

Antennas are designed to be used for particular applications. A certain antenna will have a particular radiation pattern that enables it to be utilized for a particular purpose. In some cases, multiple antennas are needed to produce a narrow directive beam pattern in addition to an omnidirectional beam pattern. This is difficult to mobilize in the filed since multiple antennas with associated transmission equipment are needed. Having to carry a variety of different antennas for different functionalities can be prohibitive due to the weight and space required. Reconfigurability between antenna types could allow for different pattern shapes to be realized without needing a unique antenna for every pattern scenario.

BRIEF DESCRIPTION OF THE DRAWINGS

For a more complete understanding, reference is now made to the following description taken in conjunction with the accompanying Drawings in which.

DETAILED DESCRIPTION

Figure 1:
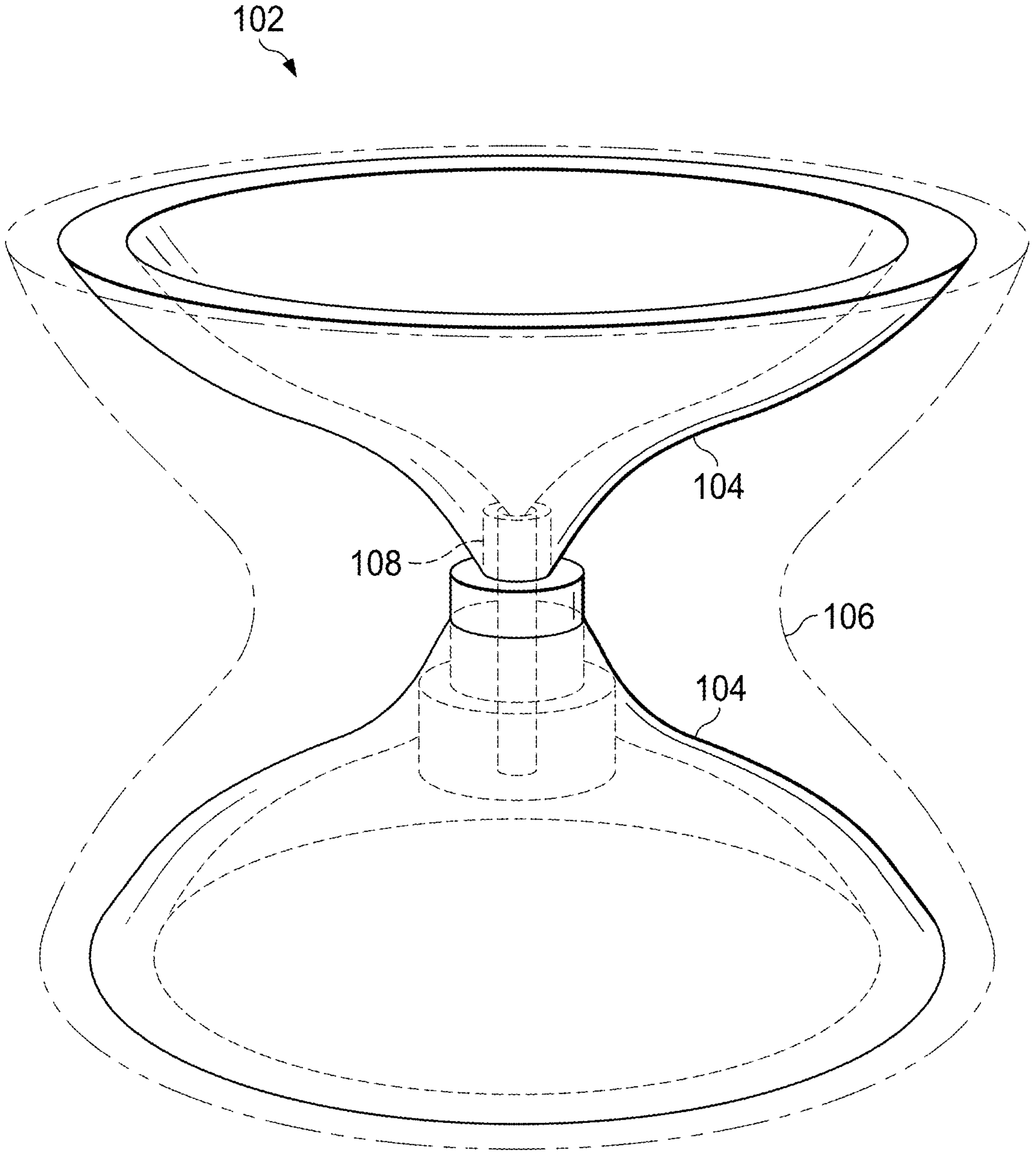
FIG. 1 illustrates a biconical antenna.
Figure 2A:
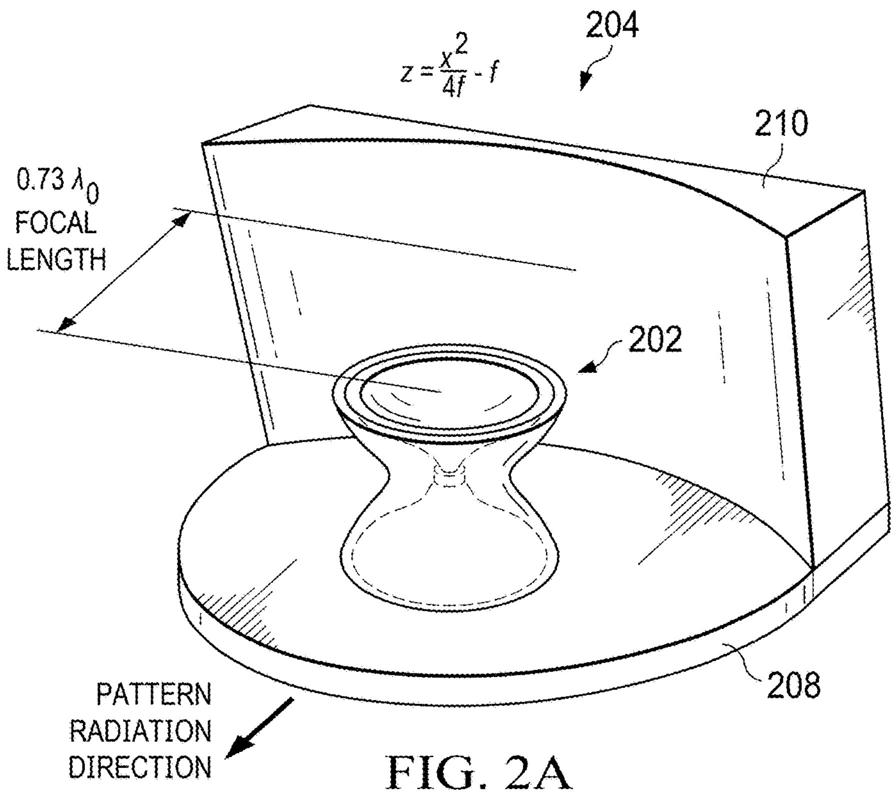
FIGS. 2A-2D illustrate various views of a reflector for use with a biconical antenna.
Figure 2B:
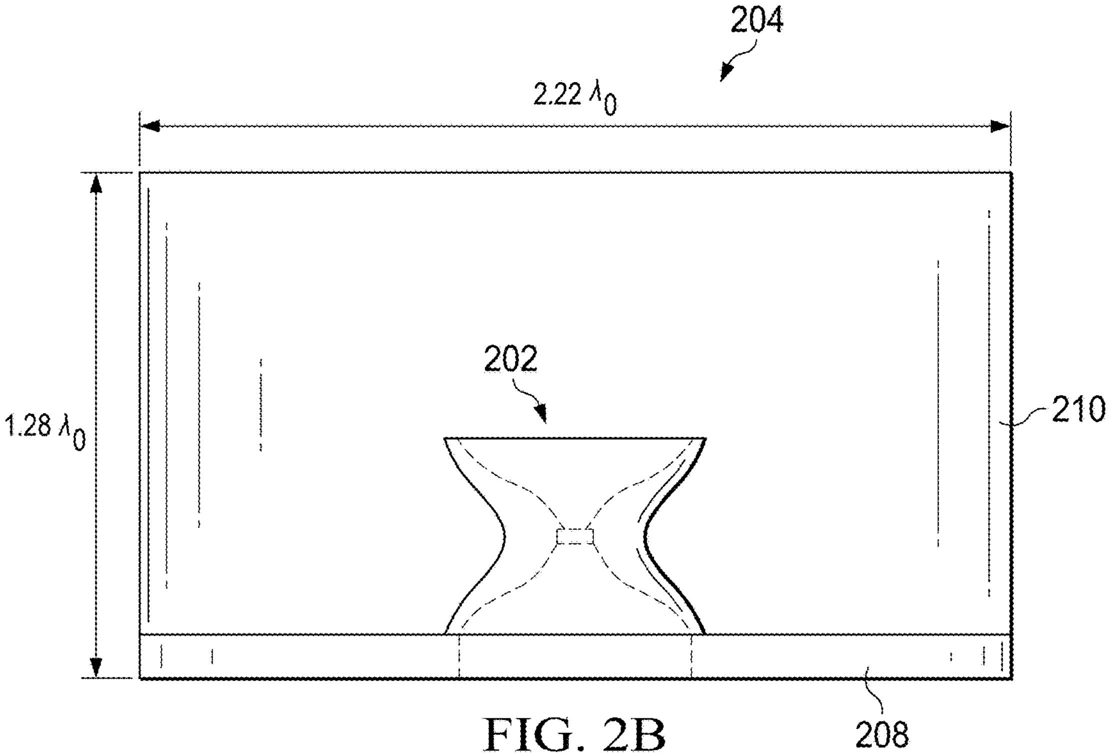
Figure 2C:
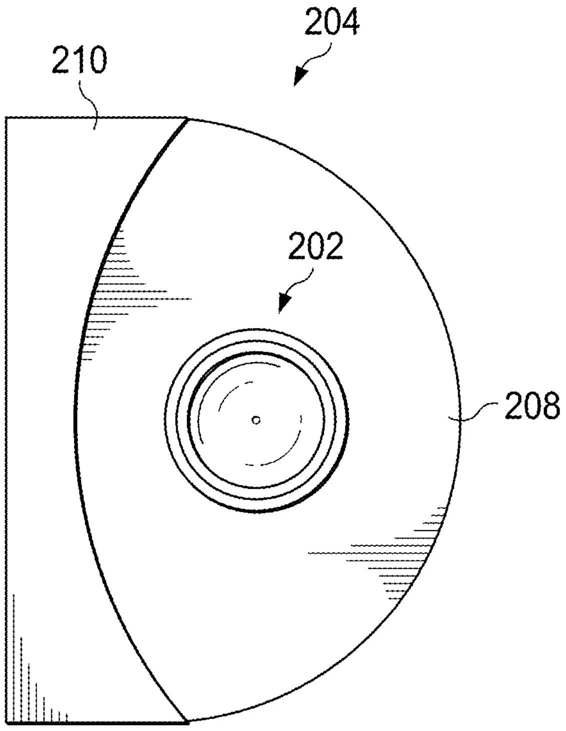
Figure 2D:
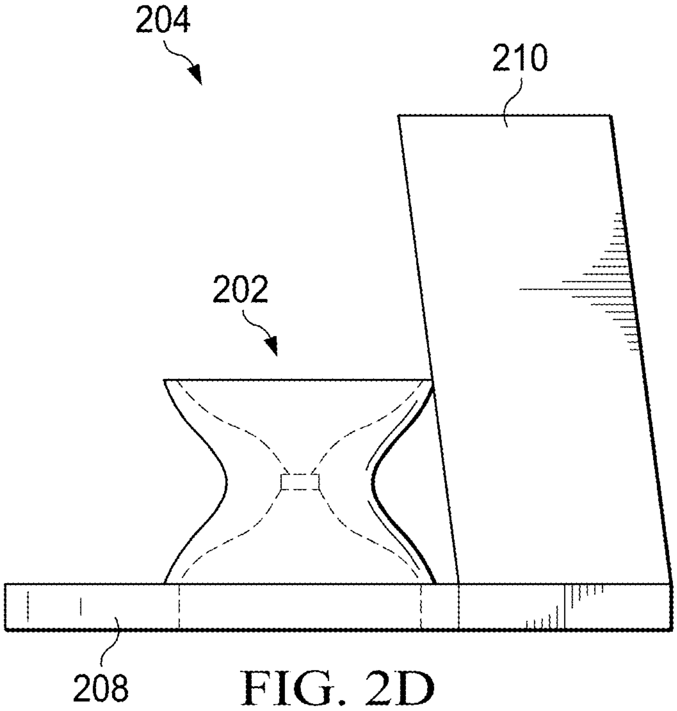

One manner for increasing the flexibility of an antenna involves the use of a reconfigurable reflector that may have an antenna installed thereon in order to alter the radiation characteristics of the antenna. Referring now to FIG. 1, there is illustrated a biconical antenna 102. The biconical antenna 102 consists of a pair of metallized cones 104 that are interconnected at the small end thereof that are surrounded by a dielectric material 106. The biconical antenna 102 includes a sinusoidal taper on the cones 104. At the connecting point between the two metallized cones 104 is a coaxially fed radiating element 108 for emitting the RF signals. The biconical feed antenna 102 has radially symmetric coverage over all ø values to the horizon. This is great for an omni-directional stand-alone unit.

Referring now to FIGS. 2A-2D, there are illustrated various views of a biconical antenna 202 removably attached to a reflector 204. The reflector 204 comprises a metallic ground plane 208 upon which the biconical antenna 202 is removably attached. The biconical antenna 202 is connected to the ground plane 208 via a number of studs or bolts (not shown) that extend downward from the base of the antenna 202 and are connected to the ground plane 208 via nuts (not shown). Extending upward from the ground plane 208 is a tilted parabolic reflector 210. The curved face of the parabolic reflector 210 defines the beam that is reflected by the parabolic reflector. The nature of the beam can be a fan beam or narrow beam projection depending upon the particular use needed from the reflector 204. Differing types of projected beams from the reflector 204 may be achieved by switching out the reflector to another reflector having a differing curvature associated therewith. Thus, the same antenna can provide both a fan beam or a narrower beam projection depending upon the particular reflector 204 curvature illuminated by antenna 202.

The material comprising the reflector 204, ground plane 208 and tilted parabolic reflector 210 may comprise a metal. In an alternative embodiment, the reflector may comprise some non-metallic material that has a metallic coating deposited thereon.

The curvature of the parabolic reflector 210 is governed by the equation:

$$z=(x^2)/4*f)-f$$

where f is the focal length of the reflector and x and z comprise Cartesian system coordinates. The "4" coefficient is normally 4 for parabolic reflectors. This gives the properly shaped beam with patterns at the desired frequencies. The focal length distance between the biconical antenna's center located central to the reflector is 0.73 $\lambda_0$ at a first frequency (center of first band) and 1.26 $\lambda_0$ at a second frequency (center of second band). At this short distance, the reflector 204 behaves in dual roles. One role is that of a parabolic reflector and the other is a traditional ground plane. The "4" coefficient can also be altered, say to 3.5, to spoil the reflector's curvature resulting in a "reconfigured" broadening of the pattern's beam that emanates from the reflector's surface.

The beam pattern projected by the reflector 204 tilts upward due to the effects of the ground plane 208. The tilt of the of the parabolic reflector 210 towards the antenna 202 enables the beam pattern projected by the reflector to be directed properly downward (horizontally) by counteracting the upward tilt to the beam pattern caused by the ground plane 208.

Figure 3:
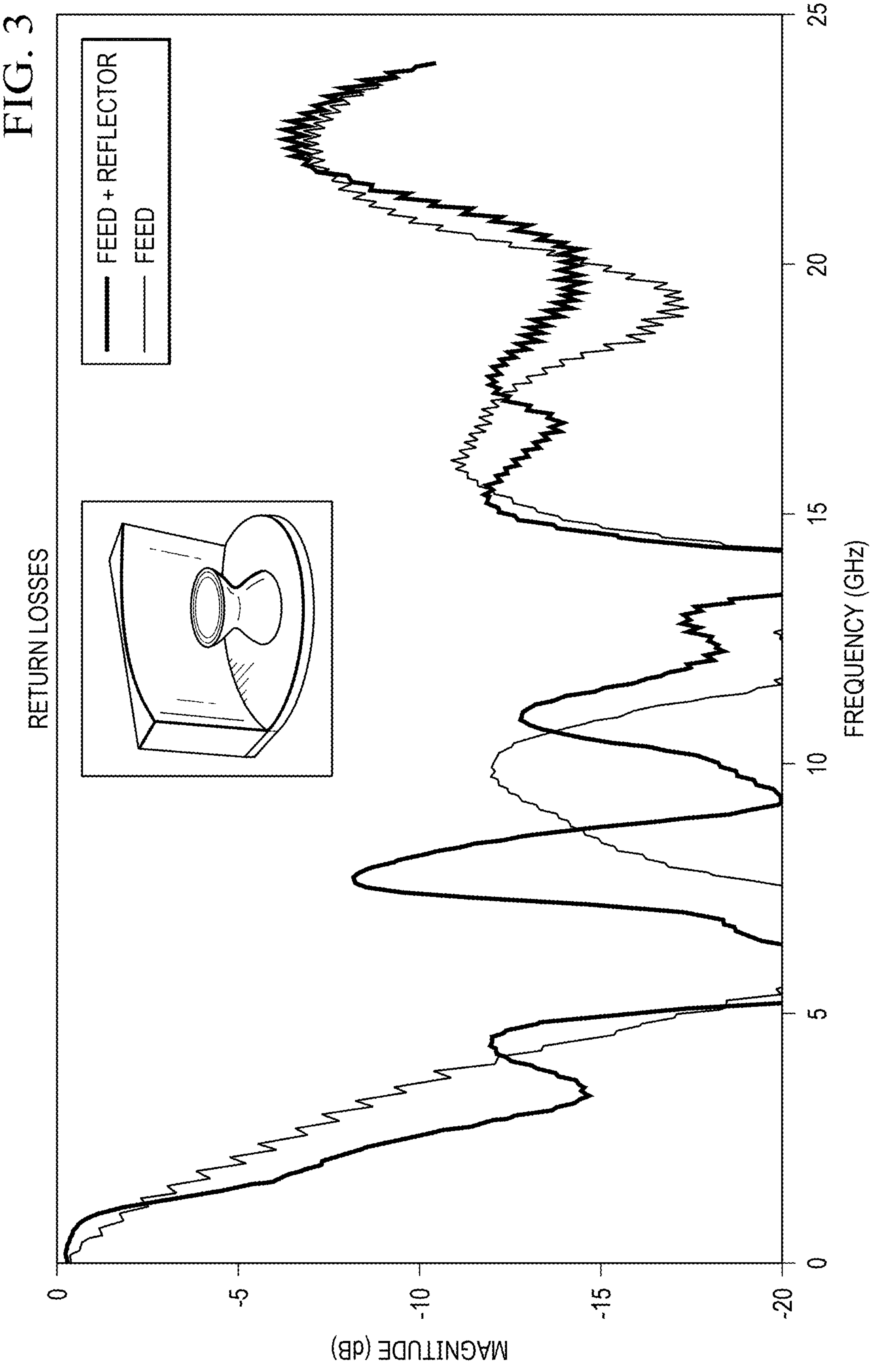
FIG. 3 illustrates the return losses for the biconically-fed reflector.

Referring now to FIG. 3, the antenna 202 and associated reflector 204 provide better than −10 dB $S_{11}$ return losses across the 2.5 to 21 GHz band as shown with the black curve. The gray curve shows that the bicone feed by itself is similarly matched over the 2.5 to 21 GHz band. These return losses are measured at the biconical feed's SMA input port.

Figure 4:
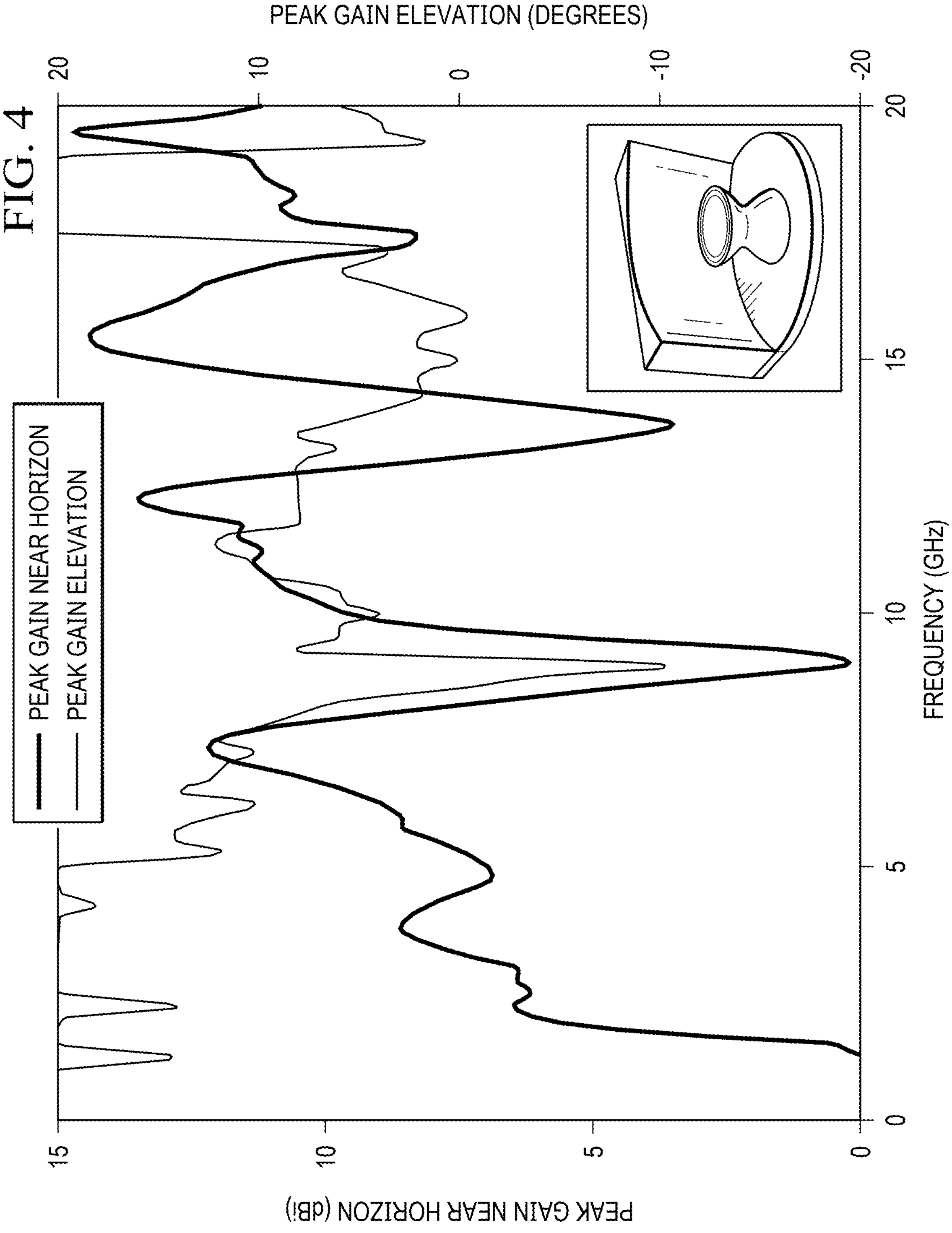
FIG. 4 illustrates the measured gains of the biconically-fed reflector.

Referring now to FIG. 4, there is illustrated the peak elevation gains and the associated elevation angle measured from the horizon at which these peak gains occur. The biconical antenna 202 feed's inherent wide bandwidth allows for regions of good gains located within the 2 to 20 GHz range. The harmonic cyclic up/down nature of the peak gain over frequency is clearly seen, and this is due to the reflector 204 acting as a ground plane in close proximity to the biconical feed antenna 202. The peak gain theta locations are close to 15° for the first band (2 to 7.5 GHz), 10° for the second band (10 to 12.5 GHz), and 0° (horizon) for the third band (15 to 16.5 GHz).

Figure 5A:
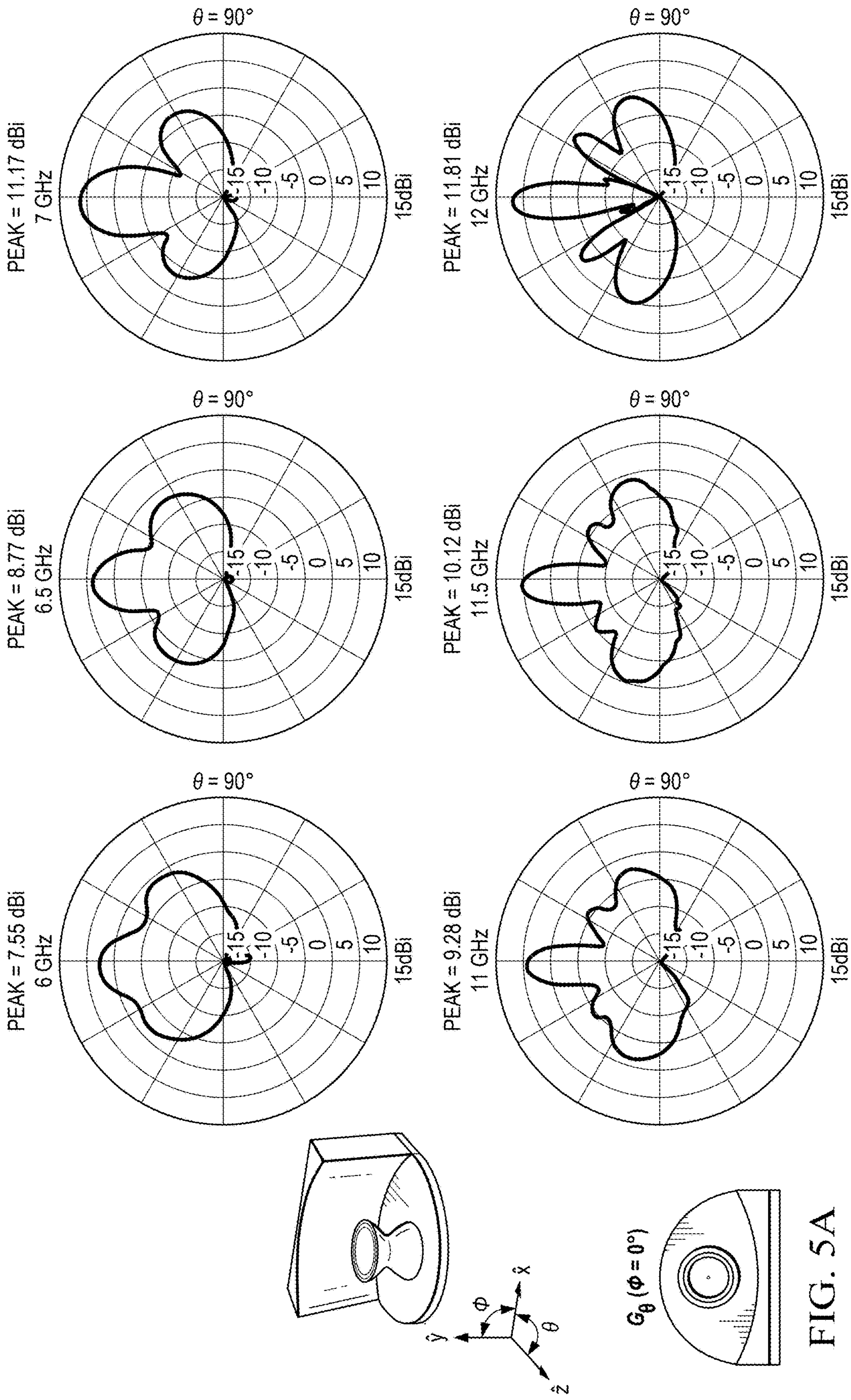
FIGS. 5A and 5B illustrate the measured elevation gain patterns of the biconically-fed reflector.
Figure 5B:
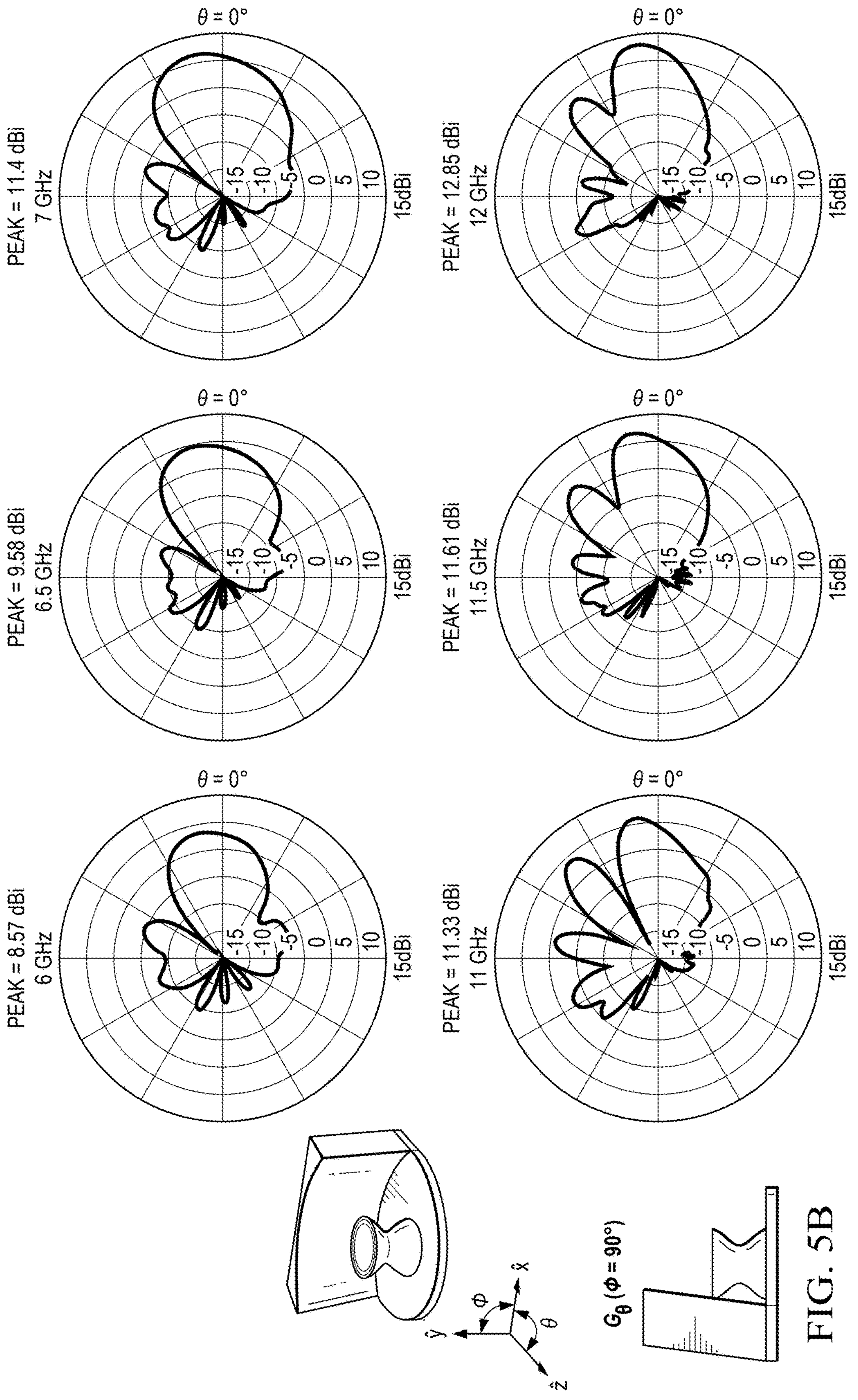

Referring now to FIGS. 5A and 5B, there are a coordinate system for describing the antenna patterns. Elevation pattern plots are presented for the bicone-fed reflector 204 corresponding to the first two bands. The $G_\theta$ ($\phi$=0°) (FIG. 5A) patterns are more or less symmetric due to the geometric symmetric nature of that plane. The $G_\theta$ ($\phi$=90°) (FIG. 5B) plots are close to the horizon ($\theta$=0°). They kick up slightly due to the ground plane on which the bicone rests. The gains are close to 10 dB for all the frequencies shown. Patterns that exist at frequencies between the 0.5 GHz steps are also good. The addition of the reflector 210 in close proximity to the bicone 202 has "reconfigured" the omni-directional pattern into a much more directive pattern.

Figure 6A:
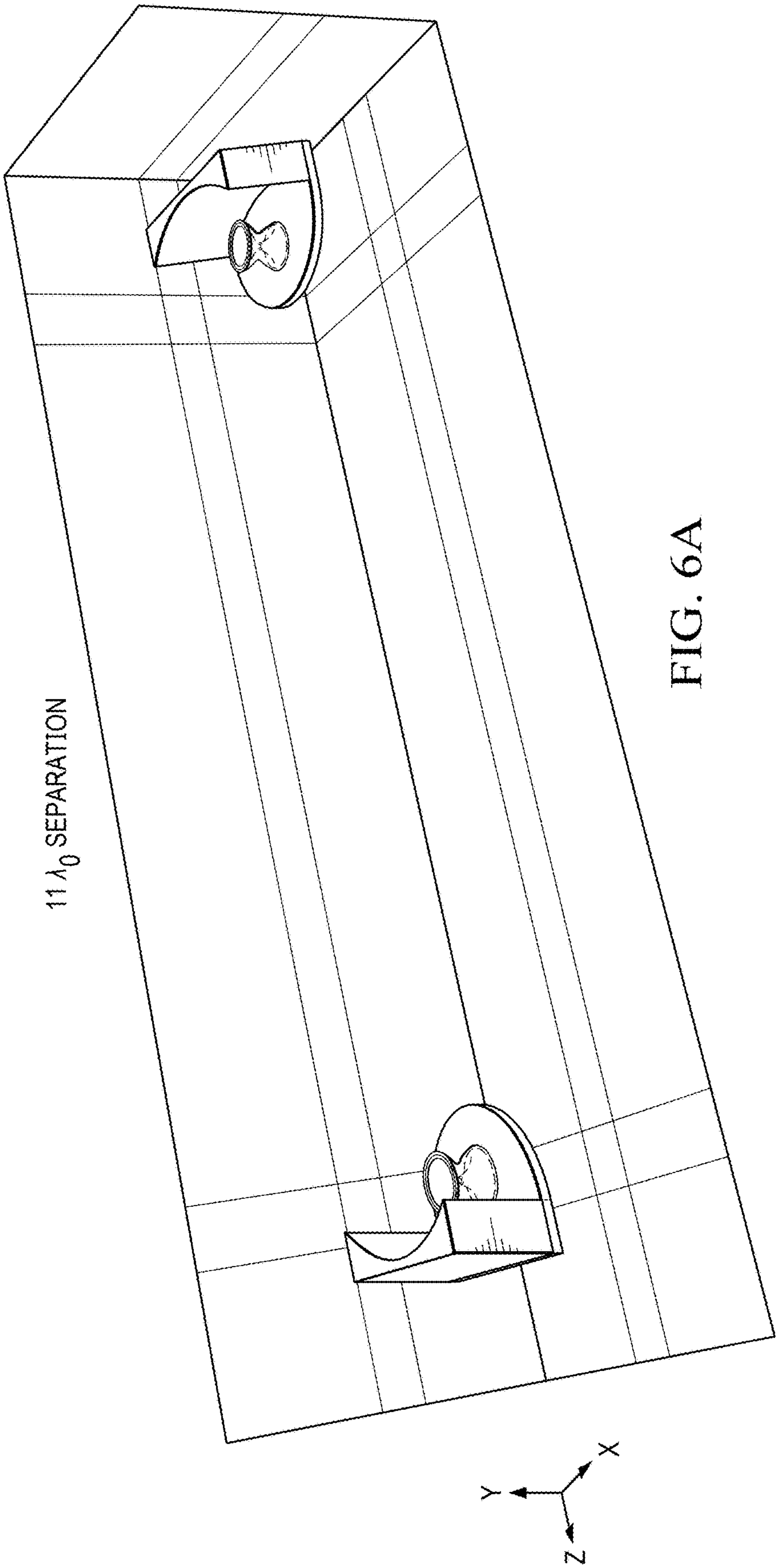
FIG. 6A illustrates a pair of biconically-fed reflector antennas.
Figure 6B:
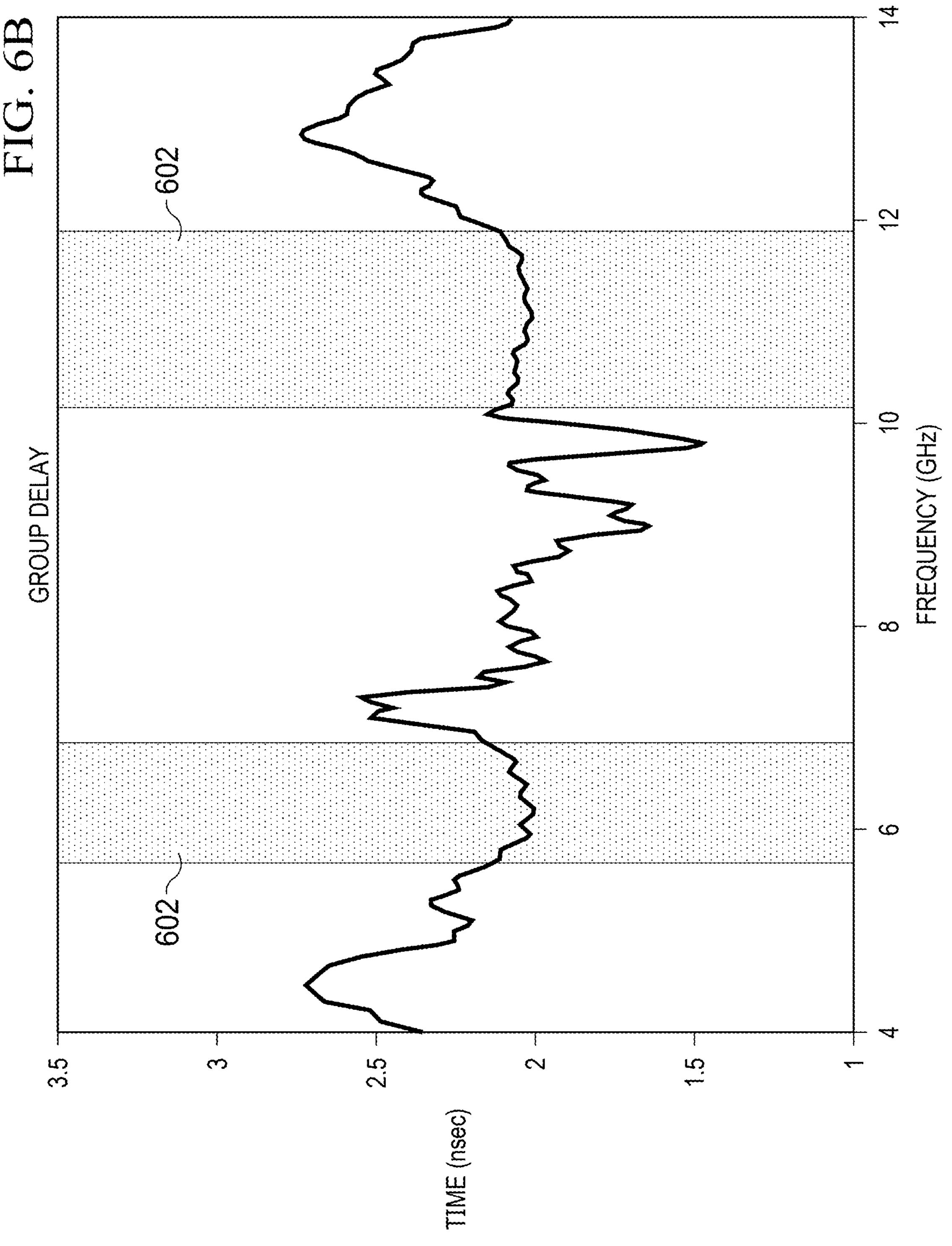
FIG. 6B illustrates the group delay performance between two identical biconically-fed reflector antennas.

Referring now to FIGS. 6A and 6B, the distortion provided by the antenna 202 and reflector 204 combination described herein. The described antenna 202 and reflector 204 combination pair provides for low distortion in various bandwidths where the group delay is flat. This enables the antenna to provide a low distortion broadband capability. The antenna-to-antenna separation in FIG. 6A is 11 $\lambda_0$, and the two boxed regions 602 in FIG. 6B around 6 and 11 GHz show where distortion is minimized.

Thus, the biconical feed antennas described herein in normal operation without a connected reflector provides wideband full 360° azimuthal omni-directional coverage. By using a tilted parabolic reflector, various wide azimuthal beamwidths can be provided as a high gain antenna. The antenna is reconfigurable by removing the antenna from one reflector and placing the antenna within a second reflector so that various types of azimuthal beamwidths may be provided. By tilting the reflector wall with respect to the ground plane of the reflector, the elevation pattern of the beamwidth may be forced to the horizon. The reflector plus biconical antenna has a better than 15 dB return loss in the desired bandwidths, and the provided patterns have around 10 dB of gain within the desired bandwidths shown.

Although the preferred embodiment has been described in detail, it should be understood that various changes, substitutions and alterations can be made therein without departing from the spirit and scope of the invention as defined by the appended claims.

What is claimed is:

1. An apparatus comprising:

a biconical antenna for generating an omnidirectional beam pattern;

a first removable reflector for reflecting the omnidirectional beam pattern from the biconical antenna as a first predetermined beamform, wherein the first removable reflector comprises;

a first horizontal ground plane removably connected to a base of the biconical antenna;

a first parabolic reflector having a bottom horizontal edge connected to a surface of the horizontal ground plane and a top horizontal edge extending from the bottom horizontal edge connected to the first horizontal ground plane at a first predetermined angle configured to reflect the first predetermined beamform responsive to the omnidirectional beam pattern;

a second removable reflector for reflecting the omnidirectional beam pattern from the biconical antenna as a second predetermined beamform;

a second horizontal ground plane removably connected to the base of the biconical antenna;

a second parabolic reflector having a bottom horizontal edge connected to the surface of the horizontal ground plane and a top horizontal edge extending from the bottom horizontal edge connected to the second horizontal ground plane at a second predetermined angle configured to reflect the second predetermined beamform responsive to the omnidirectional beam pattern; and wherein the first removable reflector having the first predetermined beamform is configured to be removed from the biconical antenna and replaced with the second removable reflector providing the second predetermined beamform.

2. The apparatus of claim 1, wherein the biconical antenna comprises a pair of metallized cones having a sinusoidal taper on the pair of cones, the pair of cones are connected at a small end of the pair of cones.

3. The apparatus of claim 2 further comprising a dielectric material surrounding the pair of cones.

4. The apparatus of claim 1, wherein the first and second predetermined angles correct for beam shift of the first and second predetermined beamforms caused by the first and second horizontal ground plane.

5. The apparatus of claim 1, wherein the first predetermined beamform is directed upward from horizontal responsive to the first horizontal ground plane and the first predetermined beamform is directed downward responsive to the first predetermined angle of the first parabolic reflector such that combined effect of the first horizontal ground plane and the first predetermined angle of the first parabolic reflector provides the first predetermined beamform substantially horizontally from the apparatus.

6. The apparatus of claim 1, wherein the biconical antenna further comprises a coaxially fed radiating element for emitting an RF signal.

7. A method comprising:

generating an omnidirectional beam pattern using a biconical antenna;

reflecting the omnidirectional beam pattern from the biconical antenna as a first predetermined beamform using a first removable reflector, wherein the step of reflecting further comprises:

directing the first predetermined beamform upward from horizontal responsive to a first ground plane of the first removable reflector;

directing the first predetermined beamform downward responsive to a first predetermined angle of a first parabolic reflector having a base connected to a bottom horizontal edge of the first parabolic reflector;

wherein a combined effect of the first ground plane and the first predetermined angle of the first parabolic reflector provides the first predetermined beam substantially horizontally from the first removable reflector;

removing the first removable reflector from the biconical antenna; and replacing the first removable reflector with a second removable reflector providing a second predetermined beamform.

8. The method of claim 7, wherein the step of directing the first predetermined beamform downward further comprises extending a parabolic reflector of the first removable reflector from a ground plane of the parabolic reflector at a predetermined angle.

9. The method of claim 7 further comprises emitting an RF signal from a coaxially fed radiating element in the biconical antenna.

10. An apparatus comprising:

a biconical antenna for generating an omnidirectional beam pattern;

a first removable reflector for reflecting the omnidirectional beam pattern from the biconical antenna as a first predetermined beamform, wherein the first removable reflector further comprises:

a horizontal ground plane removably connected to a base of the biconical antenna;

a parabolic reflector having a bottom horizontal edge connected to a surface of the horizontal ground plane and a top horizontal edge extending from the bottom horizontal edge connected to a surface of the horizontal ground plane the bottom horizontal edge connected to at a predetermined angle, wherein the predetermined angle corrects for beam shift of the first predetermined beamform caused by the horizontal ground plane;

wherein a curvature of the parabolic reflector reflects the omnidirectional beam pattern in the first predetermined beamform; and wherein the first removable reflector having the first predetermined beamform is configured to be removed from the biconical antenna and replaced with a second removable reflector providing a second predetermined beamform.

11. The apparatus of claim 10, wherein the biconical antenna comprises a pair of metallized cones having a sinusoidal taper on the pair of cones, the pair of cones are connected at a small end of the pair of cones.

12. The apparatus of claim 11 further comprising a dielectric material surrounding the pair of cones.

13. The apparatus of claim 10, wherein the first predetermined beamform is directed upward from horizontal responsive to the horizontal ground plane and the first predetermined beamform is directed downward responsive to the predetermined angle of the parabolic reflector such that combined effect of the horizontal ground plane and the predetermined angle of the parabolic reflector provides the first predetermined beamform substantially horizontally from the apparatus.

14. The apparatus of claim 10, wherein the biconical antenna further comprises a coaxially fed radiating element for emitting an RF signal.

* * * * *